US008270287B2

(12) United States Patent
Ploumen et al.

(10) Patent No.: US 8,270,287 B2
(45) Date of Patent: Sep. 18, 2012

(54) TWISTED PAIR CABLE PLANT CROSS TALK COUPLING SIMULATOR

(75) Inventors: Franciscus Ploumen, Windsor (CA); Gary Tennyson, Pelham, AL (US)

(73) Assignees: Alcatel Lucent, Paris (FR); AT&T Intellectual Property I, L.P., Reno, NV (US)

( * ) Notice: Subject to any disclaimer, the term of this patent is extended or adjusted under 35 U.S.C. 154(b) by 55 days.

(21) Appl. No.: 12/292,737

(22) Filed: Nov. 25, 2008

(65) Prior Publication Data

US 2009/0141644 A1 Jun. 4, 2009

Related U.S. Application Data

(60) Provisional application No. 60/991,438, filed on Nov. 30, 2007.

(51) Int. Cl.
*H04J 1/12* (2006.01)
(52) U.S. Cl. ........................................ 370/201; 370/249
(58) Field of Classification Search .................. 370/249, 370/201
See application file for complete search history.

(56) References Cited

U.S. PATENT DOCUMENTS

| 5,063,351 | A | 11/1991 | Goldthorp et al. |
| 6,522,707 | B1* | 2/2003 | Brandstetter et al. ......... 375/350 |
| 6,970,560 | B1 | 11/2005 | Hench et al. |
| 7,852,742 | B2* | 12/2010 | Schenk ........................ 370/201 |
| 2001/0036160 | A1* | 11/2001 | Curran et al. ................. 370/290 |
| 2008/0068978 | A1* | 3/2008 | Clausen ....................... 370/201 |
| 2008/0151742 | A1* | 6/2008 | Stolle et al. .................. 370/201 |
| 2008/0160915 | A1* | 7/2008 | Sommer et al. .............. 455/63.1 |

FOREIGN PATENT DOCUMENTS

WO WO 02/063813 A2 8/2002

OTHER PUBLICATIONS

International search report and written opinion dated Mar. 13, 2009, for counterpart International Application No. PCT/US2008/084910.
International Preliminary Report on Patentability dated Dec. 12, 2009.
ATIS T1.417-2003 (R2007) pp. 67-68.

* cited by examiner

*Primary Examiner* — Anh-Vu Ly
*Assistant Examiner* — Matthew Hopkins
(74) *Attorney, Agent, or Firm* — Harness, Dickey & Pierce, P.L.C.

(57) ABSTRACT

Example embodiments are directed to a system for simulating far end crosstalk (FEXT). The system includes digital subscriber lines coupled to a FEET matrix which simulates the FEXT environment. The FEXT matrix simulates the FEXT environment using filters disposed in disturber lines. Signals output from the filters are added to a path in the victim line to create an output signal.

20 Claims, 4 Drawing Sheets

TWISTED PAIR CABLE PLANT CROSS TALK COUPLING SIMULATOR

PRIORITY STATEMENT

This application claims the benefit of U.S. Provisional Application No. 60/991,438, filed Nov. 30, 2007.

BACKGROUND

Performance of a digital subscriber line (DSL) in terms of capacity depends on a number of factors such as attenuation and a noise environment. Since DSL is adaptive to its environment, equipment is necessary to test how well a DSL line will perform in a certain environment.

Performance of a DSL transmission system is impacted by crosstalk interference from one twisted line pair to another twisted line pair with the same binder and, to a lesser extent, twisted line pairs in neighboring binders.

An example of near end crosstalk (NEXT) and far end crosstalk (FEXT) is illustrated in FIG. 1. As shown in FIG. 1, a DSL transmission system 10 may include DSL twisted line pairs L1-Ln in a binder 15. The DSL twisted line pairs L1-Ln may extend from a central office 20 to a customer premises equipment (CPE) side 30. The DSL twisted line pairs L1-Ln may be coupled to the CPE side 30 via a DSL transceiver (not shown). The binder 15 may hold up to 25 or 50 twisted line pairs.

Any one of the lines L1-Ln may be considered a victim line and the remaining lines L1-Ln may be considered disturber lines. For the sake of clarity and brevity, L1 will be described as the victim line.

The victim line is the line in which performance is analyzed. As shown, NEXT is the coupling that occurs between a transmitted signal at the near end side of a disturber line, for example, the twisted line pairs L2-Ln, and a signal at a receiver (not shown) at the near end side of the victim line L1. Furthermore, NEXT may occur at the central office 20 side or at the side of the CPE 30, as illustrated in FIG. 1.

Contrary to NEXT, FEXT occurs when signals from the victim line L1 and signals from the disturber lines L2-Ln become coupled as the signals are sent from the central office 20 to the CPE side 30. Ignoring spectrum allocations and focusing on signal strength, FEXT is typically less harmful because attenuation of the disturber is following the same path as the attenuation of the victim line. NEXT is typically more harmful because the coupling interference has a shorter path to travel whereas the signal from the victim line L1 has a long way to travel.

However, popular deployed DSL systems like Asymmetric DSL (ADSL) and Very High Bitrate DSL (VDSL) have been designed in such a way that upstream and downstream frequency bands do not overlap. Consequently, NEXT is "out of band" and, thus, not harmful. On the other hand, FEXT will impact performance.

Until now, multipair DSL systems were only custom engineered prior to deployment. However, multipair systems are now being deployed in residential markets and, thus, are becoming mainstream. Thus, testing and simulating realistic crosstalk environments has become a more important aspect of the multipair DSL systems.

To simulate crosstalk, some have used a noise generator that injects noise onto the line. This is a common practice for testing DSL systems. The noise that is injected onto the line is typically generated with an arbitrary waveform generator (ARB). The waveform of the noise can be programmed. The programmed waveform will generally follow established noise and crosstalk models as documented in standards such as ATIS T1.417.

However, these implementations are limited to noise models that are put into the noise generator. Furthermore, the noise models are typically applied in a stationary fashion, thereby not allowing for testing dynamic behavior and robustness of DSL technology under non-stationary noise conditions, for example, during startup.

Another way of simulating crosstalk includes using a real cable plant assembled in a series of cable segments connected via instance relay matrices. A DSL system may be connected to such an environment to experience any-to-any pair crosstalk. However, there can be a significant variation in coupling path from one pair to another. For example, in a 25 pair cable, if crosstalk from pair 1 to 2, pair 2 to 3, pair 1 to 3 and so on was measured to form the whole 25-by-25 matrix, there would be 625 crosstalk curves, each differing from the other. Crosstalk within the same cable can also vary from segment to segment. Using such a system as a test environment does not allow for reproducible performance results.

SUMMARY

Example embodiments are directed to a reproducible system and method for simulating crosstalk.

Example embodiments provide a system for simulating a far end crosstalk environment comprising a first line coupled at a first end to a multiplexer and coupled at a second end to a first loop simulator. Each of the plurality of second lines is coupled at a first end to the multiplexer. At least one filter is disposed in one of the plurality of second lines and configured to receive an input signal and output a filtered signal. A scaling block is coupled to the at least one filter. An output path is coupled to an output for each of the first loop simulator and the scaling block. The output path is configured to output an output signal. The output path is configured to output the output signal to a customer premises equipment (CPE).

According to at least another example embodiment, a system for simulating a far end crosstalk environment comprises at least one victim line in a binder extending from a multiplexer to a first customer premises equipment. At least one disturber line in the binder extends from the multiplexer to a second customer premises equipment. A far end crosstalk matrix is disposed between each of the at least one victim line and the at least one disturber line and is configured to simulate the far end crosstalk environment.

Example embodiments also provide for a method of simulating a far end crosstalk environment. The method comprises loop simulating a first input signal to output an loop simulated signal based on the first input signal and filtering second input signals to simulate crosstalk. Furthermore, the filtered second input signals are scaled to output a scaled signal. The loop simulated signal is combined with the scaled signal to form an output signal.

BRIEF DESCRIPTION OF THE DRAWINGS

Example embodiments will be more clearly understood from the following detailed description taken in conjunction with the accompanying drawings.

FIG. 1 illustrates an example of Near End Crosstalk (NEXT) and Far End Crosstalk (FEXT) in a DSL system;

FIG. 2 illustrates an example embodiment of a system for simulating FEXT;

FIG. 3 illustrates the system for simulating FEXT according to an example embodiment with a detailed view of the FEXT matrix;

FIG. 4 illustrates a crosstalk environment which is simulated by implementing the FEXT matrix according to example embodiments.

DETAILED DESCRIPTION

Figure 1:
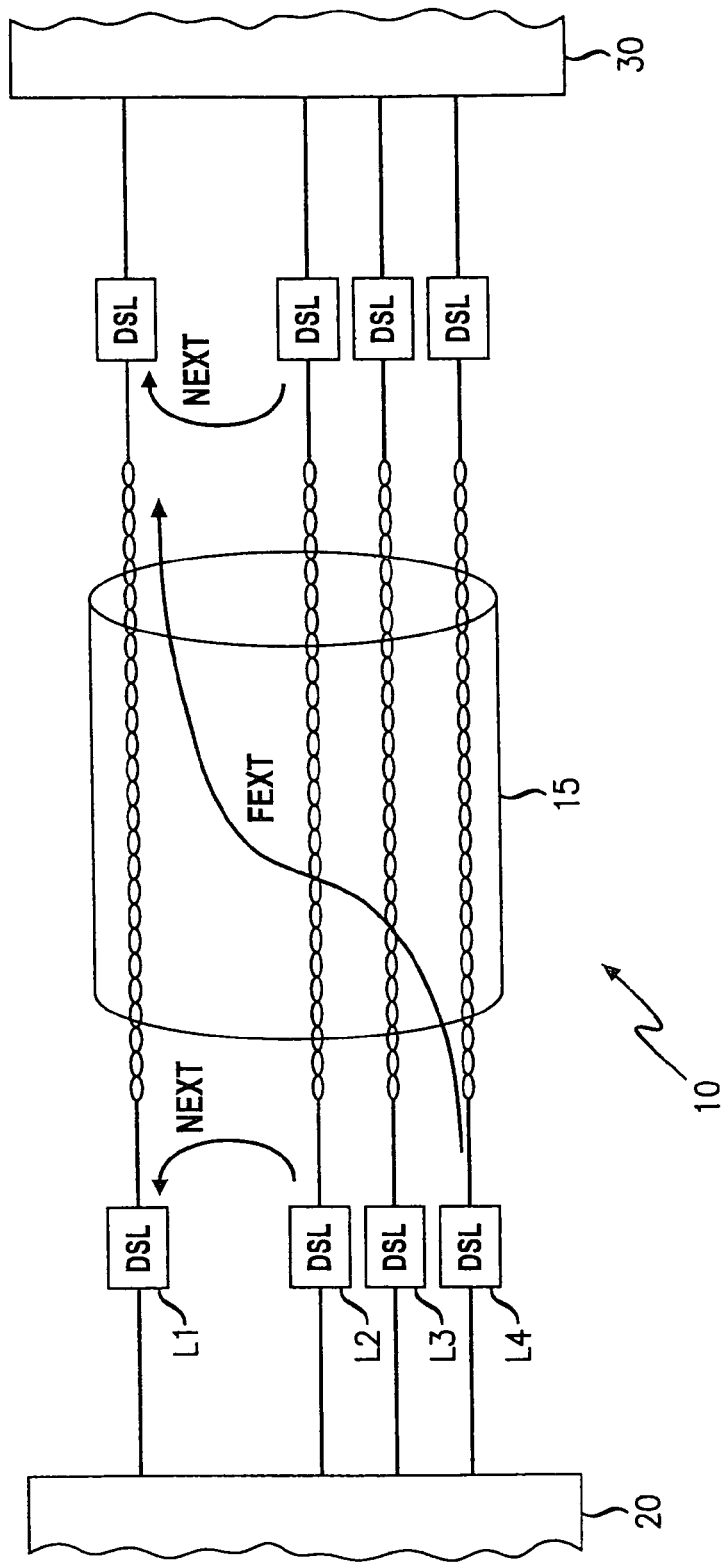
FIGS. 1-4 represent non-limiting, example embodiments as described herein.

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or"includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or. feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments are directed to a system and method to simulate a crosstalk environment and thereby be able to test dynamic behavior in DSL systems. Example embodiments provide a system where only a limited number of DSL lines need to be tested to simulate the crosstalk environment and thereby create a manageable system to simulate the crosstalk environment.

Figure 2:
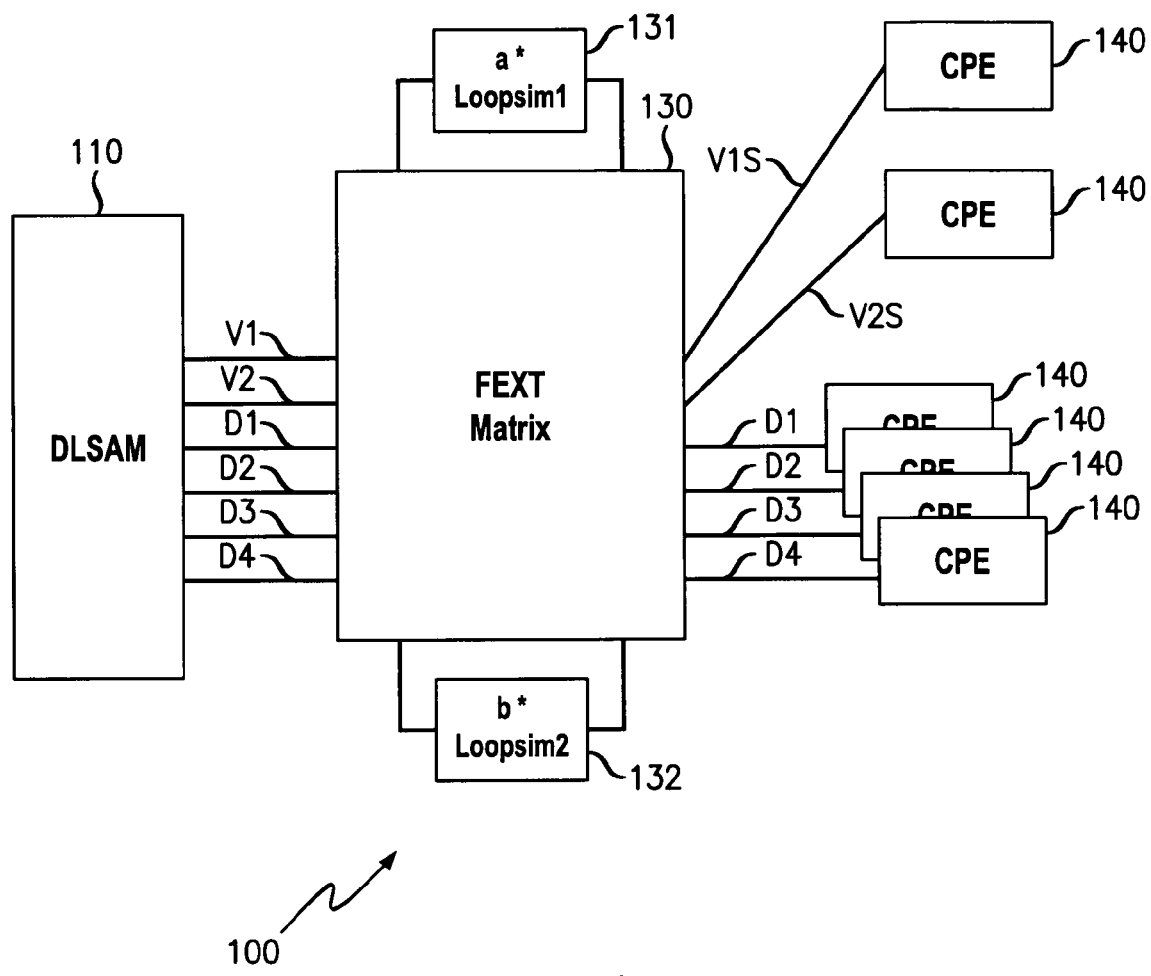

FIG. 2 illustrates an example embodiment of a system for simulating a far end crosstalk (FEXT) environment. As shown, a system 100 may include a digital subscriber line access multiplexer (DSLAM) 110 typically deployed in a central office or in a remote cabinet, a FEXT matrix 130 and CPEs 140. The FEXT matrix 130 may include first and second sets of loop simulators 131, 132.

The system 100 may include a victim lines V1-V2 and b additional disturber lines D1-D4. As shown, a equals 2 and b equals 4, however, it should be understood that the number victim and disturber lines is not limited thereto. Note that in the example embodiment illustrated in FIG. 2, victim lines are also disturbers to the other victim lines. For example, the victim line V2 is a disturber from the perspective of the victim line V1. So, the total number of disturbers is a−1+b. However, the system 100 may be designed where the victim lines are not also disturber lines. Each victim line V1-V2 and disturber line D1-D4 represents a twisted line pair, however, the victim lines V1-V2 and the disturber lines D1-D4 are not limited thereto.

Each victim line V1-V2 and disturber line D1-D4 extends from the DSLAM 110 to the FEXT matrix 130. In the FEXT matrix 130, the signals in each of the victim lines V1-V2 is subjected to a crosstalk environment. Therefore, output paths V1S-V2S, which correspond to the victim lines V1-V2, extend from the FEXT matrix 130 to corresponding CPEs 140 at a user end. The disturber lines D1-D4 are not subjected to a crosstalk environment. While the example embodiments illustrated in drawings depict the DSLAM 110 as a transmitter and the CPEs 140 as receivers, example embodiments may be implemented in the opposite direction. For example, FEAT may be simulated using the CPEs 140 as transmitters and the DLSAM 110 as the receiver.

The first set of loop simulators 131 may include two loop simulators Loopsim 1. The two loop simulators Loopsim 1 are disposed in main paths V1A-V2A (shown in FIG. 3) of the victim lines V1-V2, respectively. The second set of loop simulators 132 may include four loop simulators Loopsim 2. The four loop simulators Loopsim 2 are disposed to main paths D1A-D4A (shown in FIG. 3) of the disturber lines D1-D4, respectively.

The first and second sets of loop simulators 131, 132,—and a third set of loop simulators 410 (as will be described later with reference to FIG. 3) for the case where it's desirable to emulate the condition where the victim lines V!-V2 are longer than the disturber lines D1-D4—attenuate transmitted signals with a frequency dependent attenuation that is representative for real cable. The first and second sets of loop simulators 131, 132 may be any loop simulators known in the art, for example, a dedicated high accuracy simulator, a multipair bulk loop simulator or even a passive network that is integrated (not shown) on the FEXT matrix 130. The FEXT matrix 130 may simulate a matrix of electronics by using passive components. The advantage is that the FEXT matrix 130 can be built to be very accurate and the FEXT matrix 130 creates a reproducible environment.

Figure 3:
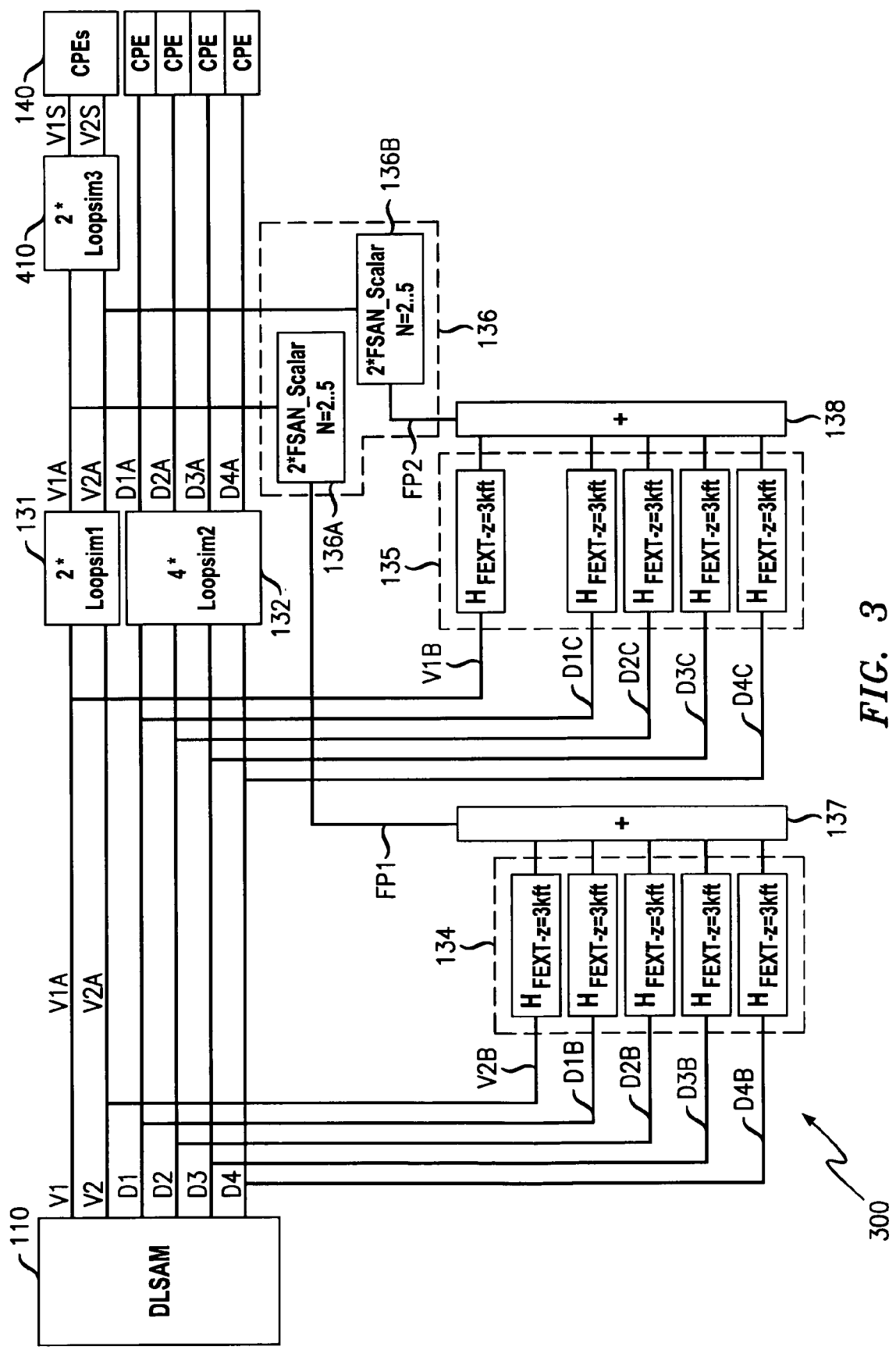

FIG. 3 illustrates a more detailed view of the FEXT matrix 130. The FEXT matrix 130 may include first and second pluralities of FEXT coupling filters 134, 135 and scaling blocks 136A and 136B. The scaling blocks 136A and 136B are included in the scaling block 136. The example embodiment illustrated in FIG. 3 includes five of the first plurality of FEXT coupling filters 134 and five of the second plurality of FEXT coupling filters 135; however, the number of FEXT coupling filters 134, 135 would differ based on the number of victim lines and disturber lines.

The victim lines V1-V2 and the disturber lines D1-D4 are coupled at one end to the DSLAM 110. Each of the victim lines V1-V2 includes the main path V1A-V2A, a feed forward path V1B-V2B and an output path V1S-V2S. Each of the disturber lines D1-D4 includes the main path D1A-D4A, a first feed forward path D1B-D4B and a second feed forward path D1C-D4C.

Disposed in the feed forward path V2B and the first feed forward paths D1B-D4B are the first plurality of FEXT coupling filters 134. The first plurality of FEXT coupling filters 134 receives input signals from the feed forward path V2B and the first feed forward paths D1B-D4B and outputs filtered signals to a first linear adder 137. As shown, the linear adder 137 receives filtered signals from the first plurality of FEXT coupling filters 134, combines the filtered signals from the first plurality of FEXT coupling filters 134 and outputs a crosstalk signal via a combined filtered path FP1.

The crosstalk signal in combined filtered path FP1 is then scaled by a scaling block 136A. The scaling block 136A outputs a scaled crosstalk signal, wherein the scaled crosstalk signal is combined with an attenuated signal in victim line main path V1A to form an output signal. The main path V1A becomes the output path V1S where the attenuated signal and the scaled signal are combined. The attenuated signal is the signal that is output from the first set of loop simulators 131 in the direction of the CPE 140. The attenuated signal from the first set of loop simulators 131 and the scaled crosstalk signal may be combined in any manner that is known in the art. The output signal is input into the third set of loop simulators 410 and output from the third set of loop simulators 410 into the CPE 140 via the output path V1S. The third set of loop simulators 410 includes two loop simulators Loopsim 3. The two loop simulators Loopsim 3 are disposed in the output paths V1S-V2S, respectively.

A similar system and method is used to obtain an output signal in the output path V2S. Disposed in the feed forward path V1B and the second feed forward paths D1C-D4C are the second plurality of FEXT coupling filters 135. The second plurality of FEXT coupling filters 135 receives input signals from the feed forward path V1B and the second feed forward paths D1C-D4C and outputs filtered signals to a second linear adder 138. As shown, the second linear adder 138 receives filtered signals from the second plurality of FEXT coupling filters 135, combines the filtered signals from the second plurality of FEXT coupling filters 135 and outputs a second crosstalk signal via a combined filtered path FP2.

The second crosstalk signal in combined filtered path FP2 is then scaled by a scaling block 136B. The scaling block 136B outputs a second scaled crosstalk signal, wherein the second scaled crosstalk signal is combined with a second attenuated signal in victim line main path V2A to form a second output signal. The main path V2A becomes the output path V2S where the second attenuated signal and the second crosstalk signal are combined. The second attenuated signal is a signal that is output from the first set of loop simulators 131 in the direction of the CPE 140. The second attenuated signal and the second scaled crosstalk signal may be combined in any manner that is known in the art. The second output signal is input into the third set of loop simulators 410 and output from the third set of loop simulators 410 into the CPE 140 via the output path V2S.

The main paths D1A-D4A extend from the DLAM 110 to the corresponding CPEs 140 with the second set of loop simulators 132 disposed in the main paths D1A-D4A.

The victim line feed forward path V2B is coupled to one of the first plurality of FEXT coupling filters 134 because the victim line V2 also functions as a disturber line from the perspective of the victim line V1. Likewise, the victim line V1 also functions as a disturber line from the perspective of the victim line V2. Therefore, there are 5 disturbers for each of the victim lines V1-V2. For example, the victim line V2 and the disturber lines D1-D4 are disturber lines on the victim line V1.

The first plurality of FEXT coupling filters 134 is designed to simulate a crosstalk environment and output filtered signals to be coupled into the main path V1A and form the output path V1S. The second plurality of FEXT coupling filters 135 is designed to simulate a crosstalk environment and output filtered signals to be coupled into the main path V2A and form the output path V2S.

In the simplest case, the victim lines V1-V2 and the disturber lines D1-D4 are of the same length. In this case, the first and second pluralities of FEXT coupling filters 134 and 135 are set to the length of the loop simulator Loopsim 1. Additionally, the third set of loop simulators 410 is not used.

Furthermore, the disturber lines D1-D4 may be on longer loops than the victim lines V1-V2, meaning that the victim lines V1-V2 leave the binder at a point closer to the DSLAM 110 than do the disturber lines D1-D4. In this case, the first and second plurality of FEXT coupling filters 134 and 135 are set to the length of the coupling, i.e., the length of the victim lines V1-V2, as emulated by the loop simulator Loopsim 1. Additionally, the third set of loop simulators 410 is not used.

Finally, the disturber lines D1-D4 could be on shorter loops, meaning that the victim lines V1-V2 would travel further once leaving the binder with the disturber lines D1-D4. In this case, the first and second pluralities of FEXT coupling filters 134 and 135 are set to the length of the coupling, i.e., the length of the disturber lines D1-D4, as emulated by the loop simulator Loopsim 2. Also, in this last case, the third set of loop simulators 410 as shown in FIG. 3 is used to simulate the attenuation on the cable segment carrying only the victim lines V1-V2.

For example, if the victim lines V1-V2 are 4 kft. and the disturber lines D1-D4 are 3 kft., there is 1 kft. where the victim lines V1-V2 travel "alone". The first and second set of loop simulators 131 and 132 could be configured for the same loop length. Therefore, the third set of loop simulators 410 may be disposed in the output paths V1S-V2S to simulate the 1 kft.

Each of the first and second pluralities of FEXT coupling filters 134 and 135 may possess similar characteristics. Furthermore, each of the first and second pluralities of FEXT coupling filters 134 and 135 may represent a path from one of the disturber lines D1-D4 to one of the victim lines V1-V2 in the binder. The first and second pluralities of FEXT coupling filters 134 and 135 may be implemented using the crosstalk characteristics from literature such as ATIS T1.417:

$$FEXT[f, n, 1] = S(f) * |H(f)|^2 * X_F * n^{0.6} * l * f^2 \quad (1)$$

$$Xtalk\left(f, n = \sum_{i=1}^{N} n_i\right) = \left(\sum_{i=1}^{N} Xtalk(f, n_i)^{1/0.6}\right)^{0.6} \quad (2)$$

where H(f) is the insertion gain transfer function affecting a disturber signal, $X_F=7.74*10^{-21}$, n=number of disturbers, l=the FEXT coupling path length in feet, f=frequency in Hz and S(f) is the power spectrum of the interfering system at a point of coupling. Xtalk is FEXT, n is the number of disturbers and N is the number of unlike disturbers. Here, n=a–l+b.

When Equation (1) above is used in mathematical models, S(f) represents the steady-state Power Spectral Density of the disturbing system. It is not a part of the FEXT coupling, per se. Accordingly, the first and second pluralities of FEXT coupling filters 134 and 135 do not incorporate this term. This yields a subtle but important benefit. The system 100 couples real disturbing signal(s), which may have characteristics that vary with time and, therefore, are not well-represented by S(f). Such signals may occur, for example, when a DSL signal is initializing. The system 100 allows for evaluating the impact of time-varying signals on the performance of the victim lines V1-V2. Since the time-varying nature of the disturber lines D1-D4 is not well understood before tests begin, such an impact is generally not readily assessed with test systems utilizing noise generators.

ATIS T1.417 provides spectrum management requirements and recommendations for the administration of services and technologies that use metallic subscriber loop cables. The standard provides a generic analytical methodology to determine spectral compatibility based on published loop specifications and crosstalk models.

Each of the first and second pluralities of FEXT coupling filters 134 and 135 is designed to simulate the crosstalk Equation (1). For example, FIG. 3 illustrates an example where the FEXT coupling is simulated at l=3 kft of 26 AWG CAT3 cabling. Also, the simulated length l may be equal to a length for the first set of loop simulators 131.

The scaling blocks 136A and 136B may be flat attenuators modeled after the FSAN model in ATIS T1.417, as shown in Equation (2). It's important to note that Equation (2) is a model that aggregates the crosstalk noise from various sources (e.g., disturber lines), where each source represents the 99% point on the distribution. That is, each source is represented as a function that has only a 1% likelihood of being met or exceeded in amplitude. Each such source was developed assuming the nearly-worst pair-to-pair coupling combinations in a real cable. Clearly, multiple sources of noise cannot all have these nearly-worst pair-to-pair coupling combinations, so it's inappropriate to numerically sum such sources. Instead, this model scales the individual sources so as to result in an aggregate effect that retains a low probability of occurrence. This equation is essentially scaling the individual sources so as to develop an aggregate sum. Assuming identical sources, Equation (2) reduces to the following:

$$\left[\sum_i Xtalk^{\frac{5}{3}}\right]^{\frac{3}{5}} = \left[N \cdot Xtalk^{\frac{5}{3}}\right]^{\frac{3}{5}} \quad (3)$$

$$= N^{\frac{3}{5}} Xtalk$$

$$= N^{\frac{3}{5}} \frac{\sum Xtalk}{N}$$

$$= N^{\frac{-2}{5}} \sum Xtalk$$

So, for identical inputs, Equation (2) reduces to a scaling factor applied to the sum of the inputs, as shown in Equation (3). The scaling factor is dependent only on the number of inputs. The scaling factor for two inputs is about 0.7579.

It's important to note that Equation (2) models the aggregation of crosstalk in a cable, assuming that each crosstalk source is represented as the 99% point on the distribution. We do not show here Equation 2 being reduced to simple scaling for crosstalk sources that are not identical. Instead, we rely on the following heuristic logic to employ a scaling even for non-identical sources.

Aggregation in a real cable is a vector summation, i.e., taking both magnitude and phase into account, of individual sources coupling via unique pair-to-pair combinations. Such aggregation occurs whether or not the sources are identical. A coupling that is valid for identical sources is valid for non-identical sources, even if it is not mathematically tractable to the FSAN model.

The gain is a function of the number of inputs, so in that sense, it's non-linear. The scaling blocks 136A and 136B accommodate non-linear power sum multiple FEXT contributors.

The victim lines V1-V2 are the lines under a performance evaluation test. In single pair transmission systems, only a single victim line is required. However, with multipair transmission systems, multiple victim lines are required (e.g., 2 victim lines to test 2-pair DSL systems). Furthermore, with respect to the disturber lines D1-D4, the disturber lines D1-D4 that are closest to the victim lines V1-V2 have the greatest crosstalk impact.

As shown in FIG. 3, both of the output paths V1S and V2S are coupled to the CPEs 140. The CPEs 140 may take in one of the signals in the output paths V1S and V2S or the CPEs 140 may take in each of the signals in the output paths V1S and V2S.

Figure 4:
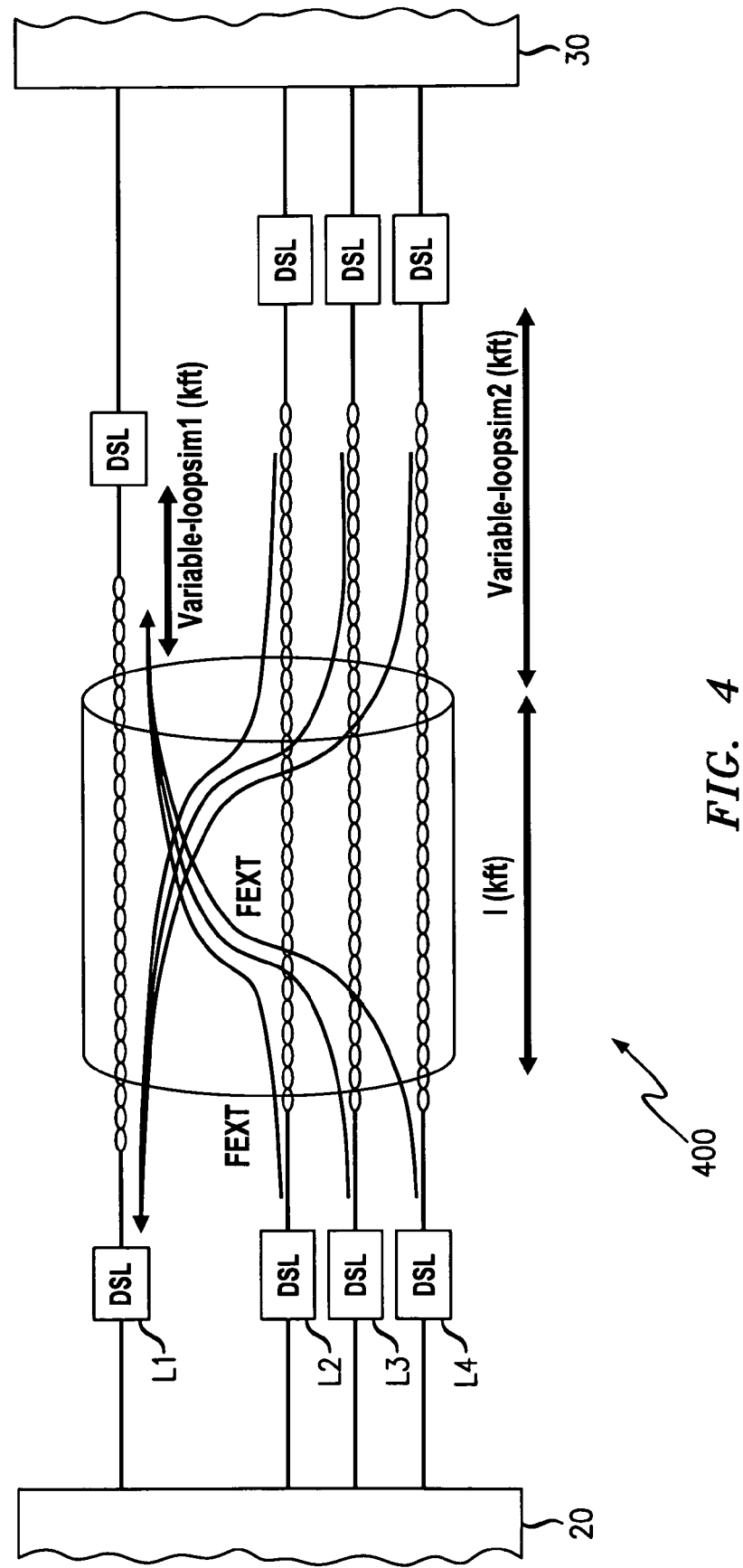

FIG. 4 illustrates a crosstalk environment which is simulated by implementing the FEXT matrix according to example embodiments. As shown, the FEXT matrix may have a variable loop simulating distance. Changing the loop distance may be accomplished by changing the third set of loop simulators 410 that are designed for a certain change of length, as described above.

Example embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the invention.

What is claimed is:

1. A system for simulating a far end crosstalk environment comprising:
    a first line coupled at a first end to a multiplexer and coupled at a second end to a first loop simulator;
    a plurality of second lines, each of the plurality of second lines coupled at one end to the multiplexer;
    at least one filter disposed in one of the plurality of second lines and configured to receive an input signal and output a filtered signal, the at least one filter being configured to simulate far end crosstalk, the at least one filter being based on variable lengths of the plurality of second lines;
    a scaling block coupled to the at least one filter; and an output path for the first line coupled to an output for each of the first loop simulator and the scaling block, the output path configured to output an output signal to a customer premises equipment;
    wherein a filter is disposed in each of the plurality of second lines and is configured to receive input signals and output filtered signals and the system further comprises:
    a linear adder configured to combine the filtered signals and output a crosstalk signal, the scaling block is configured to scale the crosstalk signal and output a scaled crosstalk signal, the first loop simulator is configured to attenuate a signal on the first line to create an attenuated signal, the output path for the first line is configured to combine the attenuated signal with the scaled crosstalk signal and output a first line output signal.

2. The system of claim 1, wherein a filter is disposed in each of the plurality of second lines and configured to receive input signals and output filtered signals.

3. The system of claim 2, wherein each filter is the same.

4. The system of claim 1, wherein the plurality of second lines are disturber lines.

5. The system of claim 4, wherein the first line is a victim line.

6. The system of claim 5, further comprising:
    a second loop simulator coupled to the plurality of second lines.

7. The system of claim 6, wherein the first and second loop simulators are configured for one of the following (i) a victim loop length same as a length of a disturber loop; (ii) the victim loop shorter than the disturber loop; or (iii) the victim loop longer than the disturber loop.

8. The system of claim 1, wherein one of the plurality of second lines is coupled to the first loop simulator.

9. The system of claim 8, wherein the first line includes a filter disposed therein.

10. The system of claim 9, wherein the first line is coupled to the scaling block.

11. The system of claim 10, further comprising:
    a second output for the first loop simulator, the second output being based on the one of the plurality of second lines coupled to the first loop simulator, wherein
    the scaling block is coupled to the second output for the first loop simulator.

12. The system of claim 8, wherein the one of the plurality of second lines coupled to the first loop simulator is a victim line and a disturber line.

13. The system of claim 1, wherein a second loop simulator is disposed in the output path.

14. The system of claim 1, wherein the first loop simulator is configured to attenuate a signal on the first line to create an attenuated signal, the scaling block is configured to scale the at least one filtered signal to create a scaled signal, and the output path for the first line is configured to combine the attenuated signal with the scaled signal and output a first line output signal.

15. The system of claim 14, further comprising:
    a second loop simulator configured to receive the first line output signal and attenuate the first line output signal based on a signal of one of the plurality of second lines.

16. A method of simulating a far end crosstalk environment, the method comprising:
    loop simulating a first input signal to output an attenuated signal based on the first input signal;
    filtering a plurality of second input signals to simulate crosstalk to produce output filtered signals, the filtering being configured to simulate far end crosstalk, the filtering being based on variable lengths of the second input lines corresponding to the plurality of second input signals;
    combining the filtered plurality of second input signals based on linear adding to produce a crosstalk signal;
    scaling the crosstalk signal to output a scaled crosstalk signal; and
    combining the attenuated signal with the scaled crosstalk signal to form an output signal.

17. The method of claim 16, wherein scaling includes linearly adding the filtered second input signals.

18. The method of claim 16, wherein the first input signal is a victim signal and the second input signal is a disturber signal.

19. The method of claim 18, wherein loop simulating further includes configuring a loop simulator for one of (i) a victim loop length that is the same as a length for a disturber loop; (ii) the victim loop longer than the disturber loop; or (iii) the victim loop shorter than the disturber loop.

20. The system of claim 1, wherein the first loop simulator, at least one filter and scaling block are different and separate.

* * * * *